United States Patent [19]

Scannapieco

[11] Patent Number: 5,311,191
[45] Date of Patent: May 10, 1994

[54] AUTOMATIC ANECHOIC CHAMBER CALIBRATOR

[75] Inventor: Gerald P. Scannapieco, Bellmore, N.Y.

[73] Assignee: Grumman Aerospace Corporation, Bethpage, N.Y.

[21] Appl. No.: 970,033

[22] Filed: Nov. 2, 1992

[51] Int. Cl.$^5$ .................................. G01S 7/40
[52] U.S. Cl. ............................. 342/165; 342/1; 342/4
[58] Field of Search ............... 342/165, 1, 4, 175

[56] References Cited

U.S. PATENT DOCUMENTS

| | | | |
|---|---|---|---|
| 4,758,840 | 7/1988 | Dardenne et al. | 342/359 |
| 4,879,560 | 11/1989 | McHenry | 342/165 |
| 4,947,175 | 8/1990 | Overholser | 342/165 |
| 4,990,923 | 2/1991 | Delfeld | 342/165 |
| 5,075,681 | 12/1991 | Kartiala | 342/165 |
| 5,099,244 | 3/1992 | Larson | 342/165 |

*Primary Examiner*—John B. Sotomayor
*Attorney, Agent, or Firm*—Pollock, VandeSande & Priddy

[57] ABSTRACT

A calibration reference target fixture is mounted on a pylon having a motorized spline extending longitudinally therethrough. The body of the fixture is teardrop shaped so as to present a low reflection cross section to a transmitting antenna. The reference target itself is a hinge-mounted plate which is driven by cam means connected to the motorized spline for selectively moving the plate between a deployed exposed position and a stored position, within the recess of the fixture body.

7 Claims, 1 Drawing Sheet

U.S. Patent      May 10, 1994      5,311,191
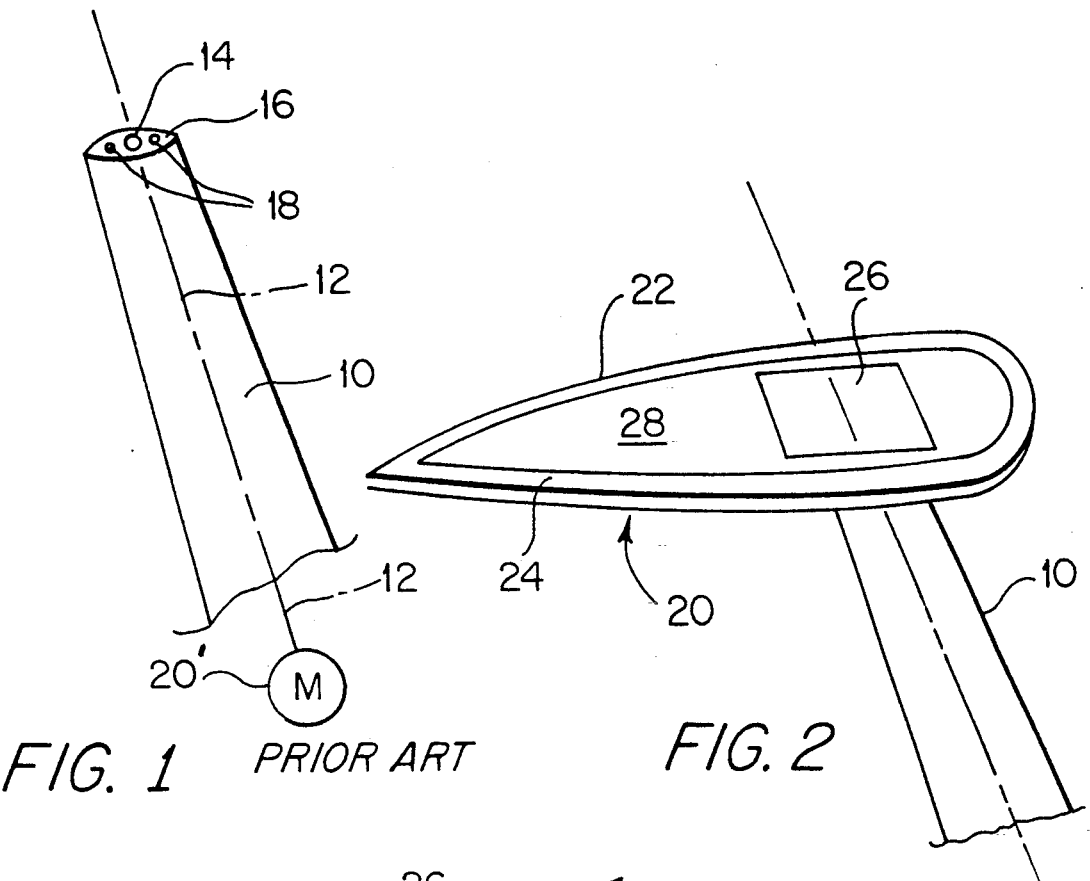
FIG. 1 PRIOR ART
FIG. 2
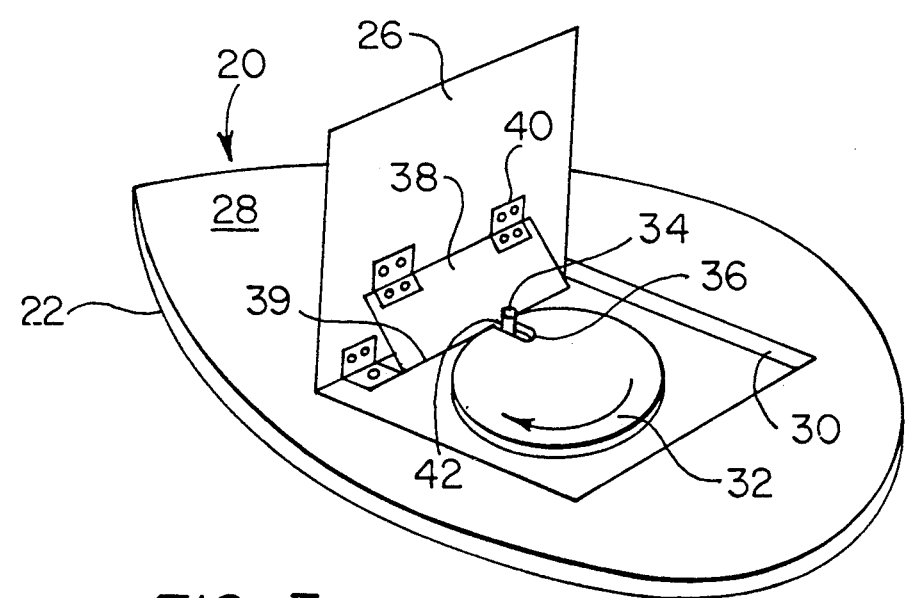
FIG. 3

AUTOMATIC ANECHOIC CHAMBER CALIBRATOR

FIELD OF THE INVENTION

The present invention deals with calibrating equipment for radar systems, and more particularly to a mechanically displaceable reflector.

BACKGROUND OF THE INVENTION

In all anechoic chambers calibrating electronic equipment for radar cross section measurements, a reference target (reflecting surface) is necessary. Typically, a metal plate, sphere, or cylinder is used as such a reference target. The usual prior art approach is to mount such a reference target on a pylon downrange from a source of radar frequency energy and within the confines of an energy-absorbing or anechoic chamber.

In order to minimize any background interference from scattering, subtraction of the effect of the pylon and other surfaces within the chamber should be made. This means that separate measurements must be made with the reference target in place and with the reference target removed.

Typically, the supporting pylons are quite high so that the reference target is elevated well above the ground. Crane-type devices, such as cherry pickers, are used to position and remove a reference target on a supporting pylon during the many calibrations that are necessary during the testing of a radar system. A good majority of today's radar cross section measurement equipment require reference target and subtraction be done before moving on to the next calibration. If, for example, twelve calibrations are needed in a single day, 24 trips are required to install and remove the reference target. This can be extremely time consuming, especially in chambers with high and remote pylons.

BRIEF DESCRIPTION OF THE PRESENT INVENTION

The present invention is directed to a mechanical pylon fixture which remotely displaces a reference target between stored and deployed positions. In the stored position, the reference target has no influence upon radar measurements so that scatter from other surfaces can be measured. This measurement forms a subtraction reference. Thereafter, a reference target is deployed on the fixture. This now establishes a reference lever for calibration.

By remotely deploying the reference target, it becomes unnecessary to manually position and remove it from a supporting pylon during repeated measurements.

BRIEF DESCRIPTION OF THE FIGURES

The above-mentioned objects and advantages of the present invention will be more clearly understood when considered in conjunction with the accompanying drawings, in which:

FIG. 1 is a partial perspective view of a pylon incorporating a rotating spline to which the present invention is mounted;

FIG. 2 is a perspective view of the present calibration fixture installed on the top of a pylon with a plate reference target being folded down into a stored position;

FIG. 3 is a perspective view of the calibration fixture illustrating the plate reference target rotated to a deployed position.

DETAILED DESCRIPTION OF THE INVENTION

FIG. 1 is a partial perspective view illustrating a conventional pylon 10 which has an ogive shape and is manufactured with a low reflectance material coating. A rotating spline 12 is schematically illustrated as extending along the axis of symmetry of the pylon. The lower end of the spline is connected to a motor 20' for causing spline rotation. The upper end of spline 12 is recessed (14) within the upper end 16 of the pylon 10. This upper end is further characterized by two pin location holes 18 which accurately position the reference target calibration fixture of the present invention as indicated in FIG. 2.

FIG. 2 indicates the mounting of a reference target calibration fixture 20 on the pylon. Although it is not shown, two location pins on the underside of the fixture mate with the holes 18 (FIG. 1). The body 22 of the fixture 20 is teardrop shaped and extends in a horizontal plane. The teardrop shape has an extremely low radar cross section in terms of reflectance to a radar system which directs its signals toward the calibration fixture. The reflectance of the calibration fixture is further reduced by having a sharp chine line or bevel 24 around the device covered with a commercially available radar energy absorbing material. The commercially available radar-absorbing material is used to terminate any traveling wave along the top surface 28 of the fixture 20, making its entire cross-section level well below most practical subtraction level requirements.

In FIG. 2 a stored reference target 26 in the shape of a plate is folded flat with the top surface 28 of the fixture 20 so that it has virtually no effect during a calibration measurement.

FIG. 3 illustrates the rotation of plate 26 to an operational position. As shown in the figure, the plate is displaced from a recess 30 formed in the body of the fixture 20. A rotating disc 32 has a stem (not shown) extending downwardly through the body 22 of the fixture 20 for coupling with motorized spline 12 (FIG. 1) of the pylon. Thus, when the spline is rotated, the disc 32 likewise rotates. An adjustable cam pin 34 is secured within a track 36 formed in the disc. The pin 34 is radially adjustable within the track 36 by means of an appropriate threaded fastener (not shown). A hinge mounted cam follower plate 38 has a lower edge 39 resting upon the top surface of disc 32. The radial position of cam pin 34 is adjusted, relative to track 36, so that when the disc 32 rotates to the position shown in FIG. 3, camming force is brought to bear against edge 39 of the cam follower plate 38 and reference target plate 26 is displaced to a position perpendicular to the top surface 28 of the fixture 20. The fixture maintains the position illustrated in FIG. 3 during reference target measurements. However, after completion of those measurements when the reference target is to be displaced to a stored position such as in FIG. 2, the disc 32 is rotated until cam pin 34 disengages from contact with the edge 39 of cam follower plate 38 thereby forcing the plate reference target 26 to fold into the recess 30. At this point, the effect of the reference target is null and further subtraction measurements may be made without the effect of the reference target plate 26.

As previously explained, since the pylons normally employed are quite high, requiring mechanical equipment to reach them, the present invention offers great convenience and time savings since the reference target may be remotely and electrically displaced between deployed and stored positions.

It should be understood that the invention is not limited to the exact details of construction shown and described herein for obvious modifications will occur to persons skilled in the art.

I claim:

1. A selectively positionable antenna reference target fixture comprising:

a teardrop shaped body having a recess formed in an upper surface thereof;

at least a portion of the surface of the body being covered by an energy absorbent material;

a rotatable member located within the recess;

camming means mounted to the rotatable member and rotatable therewith;

a hinge mounted plate having a first position covering the recess in substantially flush relation with the upper surface of the body;

a cam following member hinge mounted at a first edge thereof to a surface of the plate which faces the recess, a second edge thereof resting on the rotatable member and forced upwardly when the rotatable member rotates the camming means into pushing contact with the second edge thereby raising the plate to a second position for reflecting antenna energy;

the cam following member swinging into the recess when the rotatable member rotates the camming member out of contact with the second edge whereby the plate assumes the first position.

2. The selectively positionable antenna reference target fixture set forth in claim 1 wherein the teardrop shaped body includes a chine line covered with energy absorbent material.

3. The selectively positionable antenna reference target fixture set forth in claim 1 wherein the rotatable member is a disk having a radially extending track formed therein for adjusting the radial position of the camming means relative to the disk.

4. The selectively positionable antenna reference target fixture set forth in claim 1 wherein the camming means is a pin.

5. A selectively positionable antenna reference target fixture comprising:

a teardrop shaped body mounted to a pylon having a motorized shaft extending longitudinally therethrough;

the teardrop shaped body having a recess formed in an upper surface thereof;

the teardrop shaped body further including a chine line covered with energy absorbent material;

a rotatable member located within the recess and coupled to the shaft for rotation therewith;

camming means mounted to the rotatable member and rotatable therewith;

a hinge mounted plate having a first position covering the recess in substantially flush relation with the upper surface of the body;

a cam following member hinge mounted at a first edge thereof to a surface of the plate which faces the recess, a second edge thereof resting on the rotatable member and forced upwardly when the rotatable member rotates the camming means into pushing contact with the second edge thereby raising the plate to a second position for reflecting antenna energy;

the cam following member swinging into the recess when the rotatable member rotates the camming member out of contact with the second edge whereby the plate assumes the first position.

6. The selectively positionable antenna reference target fixture set forth in claim 5 wherein the rotatable member is a disk having a radially extending track formed therein for adjusting the radial position of the camming means relative to the disk.

7. The selectively positionable antenna reference target fixture set forth in claim 1 wherein the camming means is a pin.

* * * * *